United States Patent [19]

Ueno et al.

[11] Patent Number: 4,864,642
[45] Date of Patent: Sep. 5, 1989

[54] SPACE DIVERSITY RECEIVING SYSTEM

[75] Inventors: Eizi Ueno; Masami Takayama, both of Saitama, Japan

[73] Assignee: Pioneer Electronic Corporation, Tokyo, Japan

[21] Appl. No.: 176,527

[22] Filed: Apr. 1, 1988

[30] Foreign Application Priority Data

Apr. 8, 1987 [JP] Japan .................................. 62-86084

[51] Int. Cl.⁴ .............................................. H04B 7/08
[52] U.S. Cl. ..................................... 455/277; 455/278
[58] Field of Search ............... 455/132, 133, 134, 136, 455/140, 272, 275, 277, 234, 278; 375/100

[56] References Cited

U.S. PATENT DOCUMENTS 4,255,816 3/1981 Grunza et al. ....................... 455/136
4,525,869 6/1985 Hamada et al. ...................... 455/277

FOREIGN PATENT DOCUMENTS 0068328 4/1983 Japan .................................. 455/134
0017741 1/1984 Japan .................................. 455/277
0039649 2/1986 Japan .................................. 455/277

OTHER PUBLICATIONS

"Experimental Switched-Diversity System for UHF AM Mobil Radio", Parsons, 8/75, all.

Primary Examiner—Robert L. Griffin
Assistant Examiner—Curtis Kuntz
Attorney, Agent, or Firm—Sughrue, Mion, Zinn, Macpeak & Seas

[57] ABSTRACT

A space diversity system capable of operating accurately over a wide range of received input electric field strengths. With a middle or high received electric field strength, a search operation for the antenna with the highest strength is commenced in response to noise detected in the output of the antenna presently selected. With a low received electric field strength, the search operation is carried out in response to noise such as white noise at all times.

4 Claims, 3 Drawing Sheets

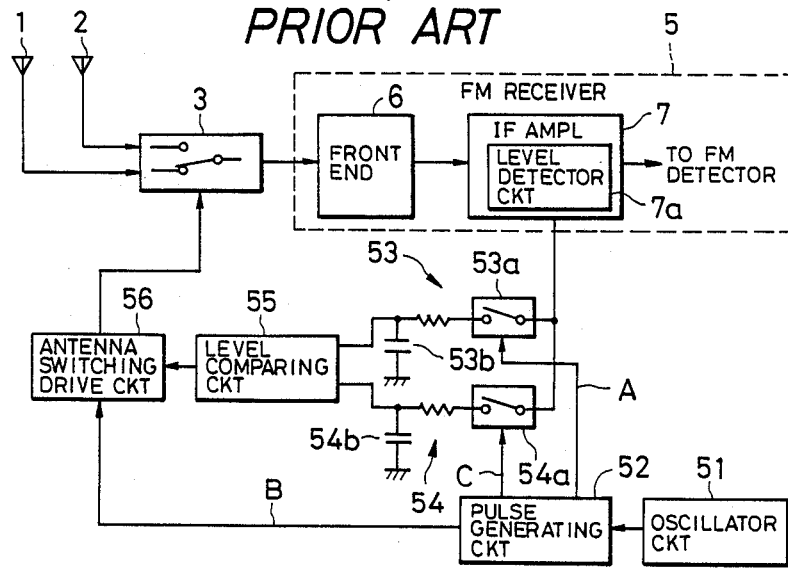
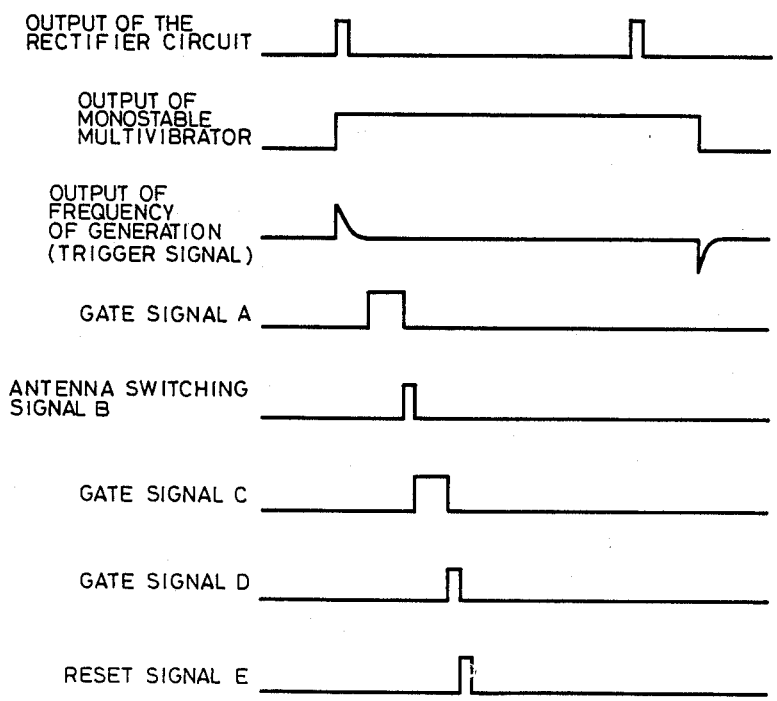

SPACE DIVERSITY RECEIVING SYSTEM

BACKGROUND OF THE INVENTION

The present invention relates to a space diversity receiving system.

An example of a conventional space diversity receiving system will be described with reference to FIG. 3. FIG. 1 is a circuit diagram, partly as a block diagram, showing a space diversity receiving system for a mobile FM receiver. The outputs of antennas 1 and 2 are applied to respective input terminals of an antenna selecting circuit 3. In response to a switching signal from an antenna switching drive circuit 4, the antenna selecting circuit 3 selects one of the outputs of the antennas 1 and 2 and applies the selected output to the front end 6 of the FM receiver 5. The FM carrier signal, after being selected and converted into an intermediate frequency signal by the front end 6, is applied to an IF amplifier 7 where it is subjected to band amplification, that is, it is amplified to a predetermined level or higher. In this operation, the IF amplifier 7 serves as a limiter to remove AM components from the carrier signal. The carrier signal thus treated is applied to a conventional FM detector circuit (not shown) and there demodulated to produce an audio signal.

The IF amplifier 7 includes a level detector circuit 7a for detecting the amplitude level of a carrier signal, for instance, by envelope detection. The output of the level detector circuit 7a is applied to the base of a transistor $Q_1$. The collector of the transistor $Q_1$ is grounded, and the emitter is connected through a resistor $R_1$ to a current source. The voltage applied to the resistor $R_1$ is proportional to the output of the level detector circuit 7a. The voltage at the connecting point of the resistor $R_1$ and the current source is applied through a resistor $R_2$ to the negative input terminal of a level comparator circuit 9, and the voltage at the connecting point of the resistor $R_1$ and the emitter of the transistor $Q_1$ is applied through an integrating circuit composed of a resistor $R_3$ and a capacitor $C_1$ to the positive input terminal of the level comparator circuit 9. When the instantaneous value of the output of the level detector circuit 7a becomes lower than the average level, the level comparator circuit 9 provides an output. According to the output of the circuit 9, the antenna switching drive circuit 4 applies the switching signal to the antenna selecting circuit 3.

The operation of the space diversity receiving system thus constructed will be described with reference to FIG. 2. The negative input (instantaneous value) of the level comparator circuit 9 is offset biased by the resistor $R_1$, and therefore it is higher in potential than the output (average value) of the integrating circuit when the received electric field strength is maintained substantially unchanged. In this case, the output of the comparator circuit 9 is held at the low level.

On the other hand, when the vehicle passes through a location where multi-path fading occurs or the electric field strength is low, the output of the level detector circuit 7a is momentarily greatly lowered, thus becoming lower than the aforementioned average value. As a result, the output of the level comparator circuit 9 is raised to the high level, and hence the antenna selected is switched over to other antenna by the antenna switching drive circuit 4. That is, a plurality of antennas located at different positions are selectively used to substantially eliminate, for instance, multi-path noise and fading.

Another example of a conventional space diversity receiving system will be described with reference to FIG. 3. In the system shown in FIG. 3, the receiving electric field strengths of antennas are detected individually so that, among the antennas, the one highest in signal reception level is selected. In FIG. 3, those circuit elements which have been previously described with reference to FIG. 1 are designated by the same reference numerals or characters.

In the system of FIG. 3, an oscillator circuit 51 applies a trigger signal having a predetermined period to a pulse generating circuit 52. In response to the trigger signal, the pulse generating circuit 52 produces a gate signal A, an antenna switching signal B, and a gate signal C successively. The pulse generating circuit 52 is, for instance, composed of a plurality of cascade-connected timers. The output of the level detector circuit 7a in the FM receiver 5 is applied to two sample and hold circuits 53 and 54. The sample and hold circuit 53 includes a switch circuit 53a which is closed when the gate signal A is applied thereto, and a time constant circuit with a capacitor 53b for holding a signal level. The sample and hold circuit 54 includes a switch circuit 54a which is closed when the gate signal C is applied thereto, and a time constant circuit with a capacitor 54b for holding the input signal level. The levels held by the sample and hold circuits are subjected to comparison by a level comparing circuit 55, which applies an output to an antenna switching drive circuit 56 in correspondence to the result of comparison. The antenna switching drive circuit 56 causes the antenna selecting circuit 3 to select an antenna in correspondence to the output of the level comparing circuit 55 and to select the other antenna in response to the antenna switching signal B. The antenna switching drive circuit 56 is composed of a circuit including logic elements, and an output transistor.

The operation of the system thus constructed will be described. The antenna selecting circuit 3 transmits the output of one of the antennas to the front end. When the trigger signal is applied to the pulse generating circuit 52 by the oscillating circuit 51, the gate signal A is supplied to the switch circuit 53a by the pulse generating circuit 52, whereby the switch circuit 53a is held closed for a predetermined period of time and the output level of the level detector circuit is held by the sample and hold circuit 53. When the pulse generating circuit 52 supplies the antenna switching signal B to the antenna switching drive circuit 56, the latter applies the switching signal to the antenna selecting circuit 3 to switch the antenna over to the other one. When the pulse generating circuit 52 supplies the gate signal C to the switch circuit 54a, the latter is held closed for a predetermined period of time, and the level detection output corresponding to the receiving level of the antenna selected is held by the sample and hold circuit 54. In the level comparing circuit 55, the levels held by the sample and hold circuits 53 and 53 are compared with each other. When the former is higher, the level comparing circuit 55 applies a high level signal to the antenna switching drive circuit 56. When the latter is higher or equal to the former, the level comparing circuit 55 applies a low level signal to the antenna switch drive circuit 56. In response the high level signal, the antenna switching drive circuit 56 supplies the switching signal to the antenna selecting circuit 3 so that the previously selected antenna is selected again. When the low level signal is applied to the antenna switching drive circuit 56, the present antenna is continued in use. The above-described operations are repeatedly carried out with a predetermined period using the trigger signal outputted by the oscillator circuit 51 so that signals are received satisfactorily at all times.

However, the system of FIG. 1 is disadvantageous in the following points: In the presence of a low electric field, the average output value of the integrating circuit 8 is low, and therefore the instantaneous value with the bias added scarcely comes below the average value. That is, the system does not work well in low electric fields. In addition, sometimes the received electric field strength of the antenna selected may be lower than that of the preceding antenna.

On the other hand, in the system of FIG. 3, the antennas are switched with the predetermined period. Therefore, in the case where the receiving electric field strength is relatively high and the S/N ratio is high, the antenna switching noise becomes significant.

SUMMARY OF THE INVENTION

Accordingly, an object of the invention is to provide a space diversity receiving system in which from among a plurality of antennas, a suitable one is selected no matter what the receiving electric field strength may be.

The foregoing object has been achieved by the provision of a space diversity receiving system in which a search operation is started in response to an abrupt change of the received electric field strength or the production of a noise component such as a white noise wherein the antenna highest in received electric field strength is selected, and the output of the antenna thus selected is applied to a receiver.

BRIEF DESCRIPTION OF THE DRAWINGS

FIG. 3 is a circuit diagram, partly as a block diagram, showing another example of a conventional space diversity receiving system;

FIG. 5 is a signal waveform diagram for a description of the operation of a pulse generating circuit in FIG. 4.

DESCRIPTION OF THE PREFERRED EMBODIMENTS

Figure 1:
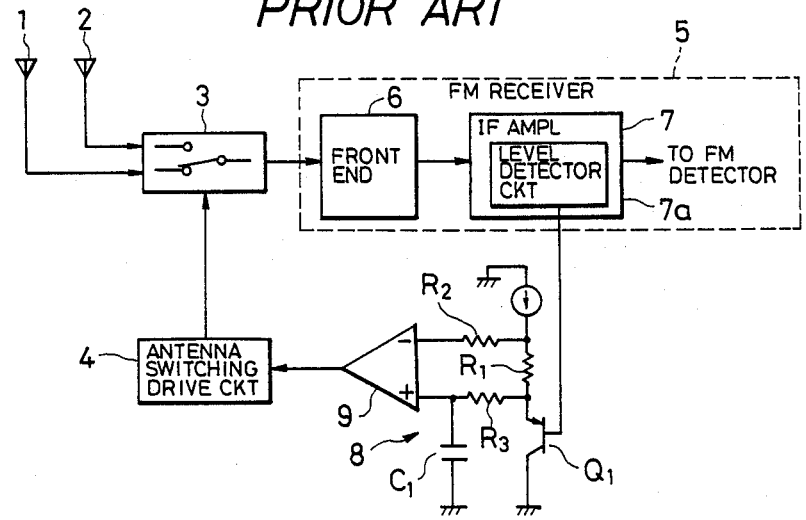
FIG. 1 is a circuit diagram, partly as a block diagram showing an example of a conventional space diversity receiving system.
Figure 2:
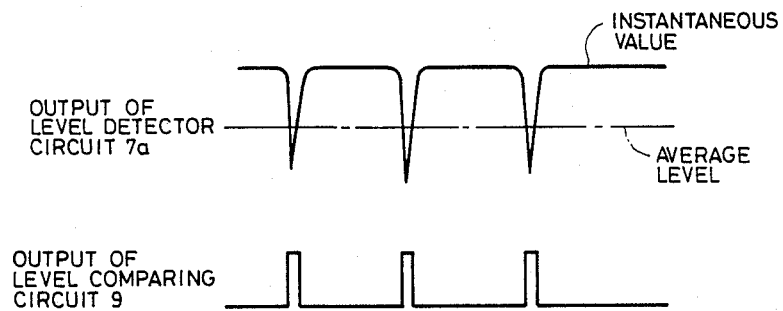
FIG. 2 is a signal waveform diagram for a description of a level comparing circuit in FIG. 1.

A preferred embodiment of the present invention will be described with reference to FIG. 4, in which circuit elements which have been previously described with reference to FIGS. 1 and 3 are designated by the same reference numerals or characters.

Figure 4:
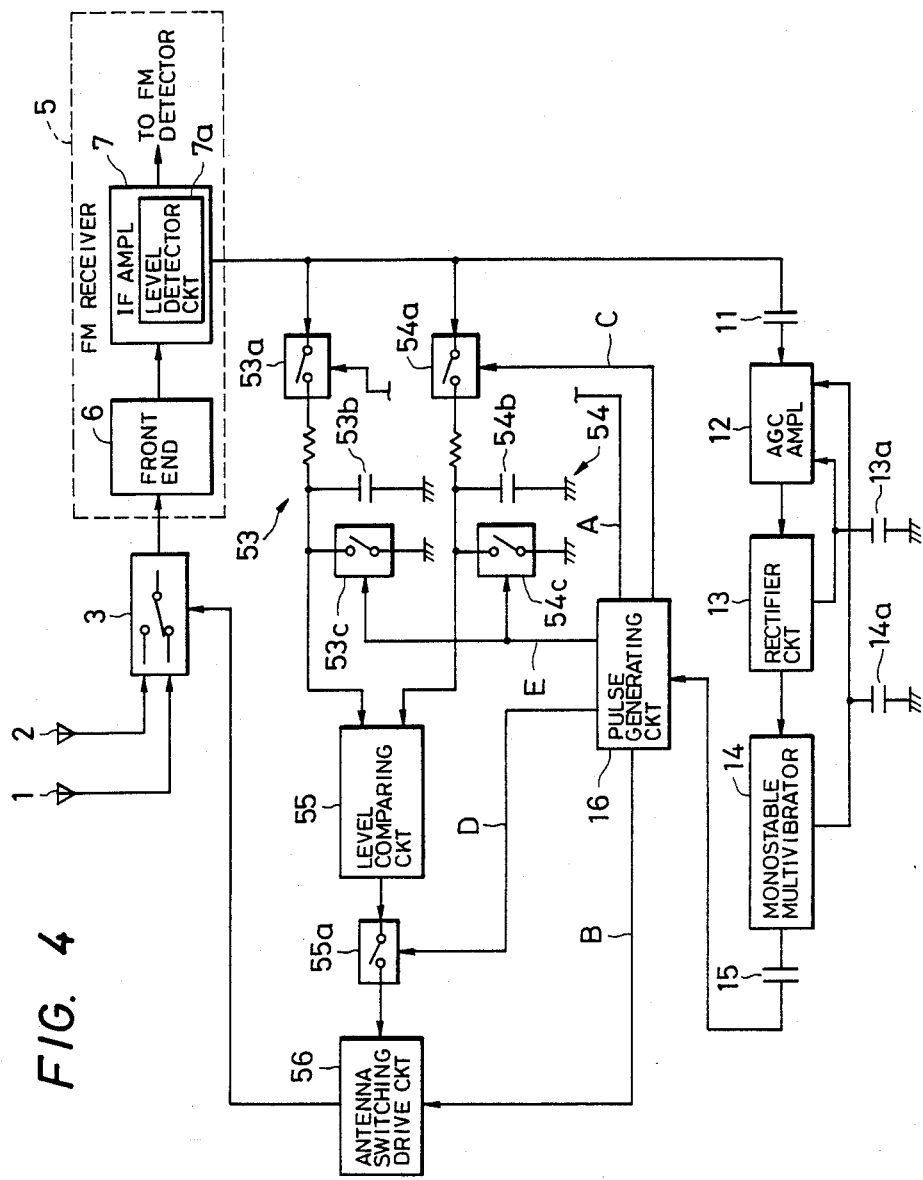
FIG. 4 is a circuit diagram, partly as a block diagram, showing an example of a space diversity receiving system constructed according to the invention.

In FIG. 4, the output of the level detector circuit 7a is applied to the sample and hold circuits 53 and 54, and it is applied to an AGC (automatic gain control) amplifier 12 through a capacitor 11 for transmitting only AC components (noise components) of the signal. In the AGC amplifier 12, the AC components of a level signal supplied thereto, i.e., the level variation component, is amplified at a gain set according to two AGC signals (described below) applied to gain control input terminals thereof. The output of the AGC amplifier 12 is applied to a rectifier circuit 13 where the AC component is rectified. The output of the rectifier circuit 13 is applied to a monostable multivibrator 14. The output of the rectifier circuit 13, after being smoothed by a capacitor 13a serving as a low-pass filter, is fed back, as an AGC signal, to the AGC amplifier 12. The AGC signal is used for separating a noise component for which an antenna switching operation is carried out (as described in detail below). The monostable multivibrator 14 produces a square-wave signal having a predetermined width when the output of the rectifier circuit 13 exceeds the operation start level thereof. The square-wave signal, after being smoothed by a capacitor 14a serving as a low-pass filter, is supplied, as another AGC signal, to the AGC amplifier 12. The square-wave signal is further applied to a differentiating circuit (capacitor) 15, from which the resulting signal is applied as a trigger signal to a pulse generating circuit 16. While an AGC gain control signal is applied to the AGC amplifier 12 by the monostable multivibrator 14, the gain of the AGC amplifier 12 is reduced to make the output noise level lower than a predetermined value to prevent the frequency of operation of the monostable multivibrator 14 from exceeding a certain value.

The pulse generating circuit 16 is formed by cascade-connecting timer circuits such as monostable multivibrators the operation of which is started with the rise of an input trigger signal. The circuit 16 provides a gate signal A, an antenna switching signal B, a gate signal C, a gate signal D, and a reset signal E successively in response to the trigger signal. The gate signal A is applied to the switch circuit 53a in the sample and hold circuit 53. The antenna switching signal B is applied to the antenna switching drive circuit 56. The gate signal C is applied to the switch circuit 54a in the sample and hold circuit 54. The gate signal D is supplied to a switch circuit 55a connected between the level comparing circuit 55 and the antenna switching drive circuit 56. The reset signal E is supplied to reset switch circuits 53c and 54c which are parallel-connected to the capacitors 53b and 54b of the sample and hold circuits 53 and 54, respectively. The remaining circuit arrangement is similar to that of the conventional systems.

The operation of the space diversity receiving system thus constructed will be described with reference to FIG. 5.

When noise components are generated by an abrupt change of the received electric field strength or noise components such as white noise are present because the electric field strength is low, the output of the level detector circuit 7a may include a noise component. The noise component is separated by the capacitor 11, amplified by the AGC amplifier 12, and then rectified by the rectifier circuit 13. When the output of the rectifier circuit 13 exceeds a predetermined level, the monostable multivibrator 14 is activated to produce the square-wave signal. The square-wave signal thus produced is differentiated to a differentiation signal, only the positive part of which is used as the trigger signal The AGC amplifier 12 operates as follows:

The gain characteristic of the amplifier is determined by the AGC signal provided by the rectifier circuit 13 so that, in the presence of a middle or high received electric field strength, the pulse generating circuit 16 is triggered in response to an abrupt change in the electric field strength which may occur in the case of multi-path fading, and when the received signal has a high degree of modulation, the pulse generating circuit is generally not triggered thereby. When the received electric field is low, in which case it is required to select the antenna higher in signal reception level and where it is rather difficult to distinguish multi-path noise from white noise, the AGC signal suspends the AGC operation or weakens it, thereby to increase the gain of the amplifier, whereby the trigger signal is produced at random and continuously.

The gain of the AGC amplifier 12 is decreased also by the AGC signal provided by the monostable multivibrator 14 in such a manner that the frequency of generation of the trigger signal does not exceed a certain value, that is, so that the antennas are not switched too frequently. This technique is effective especially in the case where the electric field strength is low.

In response to the trigger signal, the pulse generating circuit 16 produces the signals A through E successively to operate the respective circuit elements so that, of the antennas, the one highest in received electric field strength is selected. This will be described in more detail.

The gate signal A having a predetermined pulse width is applied to the switch circuit 53a in the sample and hold circuit 53. As a result, the switch circuit 53a is held closed for a predetermined period of time so that a level detection output corresponding to the presently selected antenna 1 is held by the sample and hold circuit.

The antenna switching signal B is supplied to the antenna switching drive circuit 56 to cause the antenna selecting circuit 3 to select the output of the next antenna 2.

The gate signal C is applied to the switch circuit 54b of the sample and hold circuit 54 so that a level detection output corresponding to the antenna 2 is held by the sample and hold circuit The gate signal D is supplied to the switch circuit 55a. When the switch circuit 55a is closed, the result of comparison of the levels held by the sample and hold circuits 53 and 54 is applied to the antenna switching drive circuit 56 by the level comparing circuit 55. In the circuit 55, the levels held by the sample and hold circuits 53 and 54 are compared with each other. When the level held by the circuit 53 is higher than that held by the circuit 54, the level comparing circuit 55 applies a high level signal to the antenna switching drive circuit 56. When, on the other hand, the level held by the circuit 64 is higher than or equal to that held by the circuit 53, the circuit 55 applies a low level signal to the circuit 56. In response to the above-described result of comparison, the antenna switching drive circuit 56 causes the antenna selecting circuit 3 to select one of the outputs of the antennas 1 and 2 Therefore, when a noise signal is present the antenna higher in signal reception level is automatically selected.

The reset signal E is applied to the reset switch circuits 53c and 54c of the sample an hold circuits 53 and 54 to discharge the capacitors 53b and 54b, thereby to reset the held levels. This is done to allow the sample and hold circuits to hold the level detection outputs with high accuracy in the following level holding operations. However, application of the signal E may be omitted depending on the discharge time constant.

Thus, since the gain of the AGC amplifier 12 changes with the input level, the output of the AGC amplifier is controlled during the operation of the timer. Therefore, irrespective of the electric field strength, the noise component is suitably detected, and the antenna higher in received electric field strength is selected, which prevents the antennas from being too frequently switched.

In the above embodiment of the invention, two AGC systems are employed However, the AGC amplifier may be controlled by one of the to AGC systems if desired.

In the above-described embodiment, in order to detect the noise component included in the received signal, the AC component included in the output of the level detector circuit 7a is extracted However, the following method may be employed: A signal FM-detected in a rear stage (not shown) is applied to a high-pass filter having a cut-off frequency of the order to 100 KHz to extract a noise component therefrom, and the noise component is applied to the AGC amplifier. The output of the high-pass filter, after being rectified, may be applied to the sampling circuits.

To select the antenna, a microprocessor may be used in combination with the pulse generating circuit 16, the sample and hold circuits 53 and 54, the level comparing circuit 55 and the antenna switching drive circuit 56. In this case, the level detection outputs are subjected to A/D (analog-to-digital) conversion so that, in response to the trigger signals, the level detection outputs of the antennas are successively stored in memory, and the largest of the outputs thus stored is extracted to select the corresponding antenna. Furthermore, the following method may be employed: Of the two antennas, the one higher in signal reception level is stored, and the signal reception level of the antenna thus stored is compared with that of the other antenna so that the antenna higher in signal reception level is stored. That is, the outputs of the antennas are subjected to comparison in this manner so that the antennas higher in signal reception level is detected at all times.

Similarly, a microprocessor may be used to form the AGC amplifier 12, the rectifier circuit 13 and the monostable multivibrator 14. With the microprocessor, a circuit for switching a number of antennas can be readily formed at low manufacturing cost.

As described above, in the space diversity receiving system according to the invention, with a middle or high received electric field strength, the search operation is started in response to noise whereby, of a plurality of antennas, the one highest in received electric field strength is selected. Thus, the antenna switching operation is performed only when required, with the result that the antenna switching noise is reduced. With a low received electric field strength, the search operation is carried out in response noise such as a white noise at all times. Thus, the space diversity receiving system of the invention operates suitably with any received electric field strength.

What is claimed is:

1. A space diversity receiving system in which, of a plurality of antennas, a one highest in received electric field strength is selected, and the output thereof is applied to an FM receiver, comprising:
    level detecting means for detecting a received electric field strength of a selected antenna from among said plurality of antennas;
    AC component separating means for separating an AC component from an output of said level detection means;
    trigger signal generating means for producing a trigger signal when, for a high or middle level of received electric field strength, an abrupt change occurs in said received electric field strength, and for a low level of received electric field strength, randomly and continuously; and antenna selecting means for selecting an antenna presently highest in received electric field strength in response to said trigger signal.

2. The space diversity receiving system of claim 1, wherein said trigger signal generating means comprises: an AGC amplifier; a capacitor coupling a signal received from a presently selected antenna to a signal input of said AGC amplifier; means for rectifying an output of said AGC amplifier; a monostable multivibrator having a trigger input coupled to an output of said rectifying means; and differentiating means coupled to an output of said monostable multivibrator, said trigger signal being produced on an output of said differentiating means.

3. The space diversity receiving system of claim 2, further comprising: a first low-pass filter coupled between said output of said rectifying means and a first gain control input of said AGC amplifier; and a second low-pass filter coupled between said output of said monostable multivibrator and a second gain control input of said AGC amplifier.

4. The space diversity receiving system of claim 1, wherein said antenna selecting means comprises: level comparing means; pulse generating means comprising a plurality of cascade-connected monostable multivibrators; antenna switching means for successively coupling said antennas to said level comparing means in response to outputs of said pulse generating means; and means for selecting one of said antennas in response to an output of said level comparing means.

* * * * *